United States Patent
Mergler et al.

(10) Patent No.: US 8,053,128 B2
(45) Date of Patent: Nov. 8, 2011

(54) APPARATUS FOR SOLID-OXIDE FUEL CELL SHUTDOWN HAVING A TIMING CIRCUIT AND A RESERVOIR

(75) Inventors: Christopher M. Mergler, West Henrietta, NY (US); Sean M. Kelly, Pittsford, NY (US)

(73) Assignee: Delphi Technologies, Inc., Troy, MI (US)

( * ) Notice: Subject to any disclaimer, the term of this patent is extended or adjusted under 35 U.S.C. 154(b) by 833 days.

(21) Appl. No.: 12/082,334

(22) Filed: Apr. 10, 2008

(65) Prior Publication Data
US 2009/0258267 A1 Oct. 15, 2009

(51) Int. Cl.
*H01M 8/04* (2006.01)
(52) U.S. Cl. ...................................................... 429/442
(58) Field of Classification Search .................. 429/442, 429/495, 428, 488, 508, 513
See application file for complete search history.

(56) References Cited

U.S. PATENT DOCUMENTS

| | | | | |
|---|---|---|---|---|
| 2,628,995 A | * | 2/1953 | Shanklin | 174/11 R |
| 6,620,535 B2 | * | 9/2003 | Mukerjee et al. | 429/442 |
| 6,709,782 B2 | * | 3/2004 | Keegan et al. | 429/495 |
| 6,773,845 B2 | * | 8/2004 | Keegan | 429/495 |
| 6,915,869 B2 | * | 7/2005 | Botti et al. | 180/65.245 |
| 7,008,709 B2 | * | 3/2006 | Keegan et al. | 429/430 |
| 7,595,126 B2 | * | 9/2009 | Wells et al. | 429/483 |
| 2002/0168555 A1 | | 11/2002 | Mukerjee et al. | |

FOREIGN PATENT DOCUMENTS

| | | |
|---|---|---|
| JP | 07169493 A | 7/1995 |
| WO | 9927598 | 6/1999 |
| WO | 03075381 | 9/2003 |

OTHER PUBLICATIONS

EP Search Report dated Jun. 25, 2009.

* cited by examiner

*Primary Examiner* — Chandrika Prasad
(74) *Attorney, Agent, or Firm* — Thomas N. Twomey

(57) ABSTRACT

An emergency shutdown apparatus for a solid-oxide fuel cell system, including a fuel cell stack, comprises a reservoir containing a reducing fluid, a valve enabling or preventing flow of the reducing fluid from the reservoir to the fuel cell stack, a timing circuit operating and controlling the valve, and a battery powering the timing circuit. The apparatus for an emergency system shutdown is able to operate independently of the main power plant and does not require any active control from the solid-oxide fuel cell system. The disclosed apparatus is entirely a stand-alone component that may be added to any conventional solid-oxide fuel cell system. The apparatus in accordance with the invention can be recharged, allowing the same hardware to be used over and over, however, a disposable unit could be used if found to be desirable.

26 Claims, 2 Drawing Sheets

US 8,053,128 B2

APPARATUS FOR SOLID-OXIDE FUEL CELL SHUTDOWN HAVING A TIMING CIRCUIT AND A RESERVOIR

RELATIONSHIP TO GOVERNMENT CONTRACTS

The present invention was supported in part by a U.S. Government Contract, No. DE-FC2602NT41246. The United States Government may have rights in the present invention.

TECHNICAL FIELD

The present invention relates to fuel cells having a solid-oxide electrolyte layer separating an anode layer from a cathode layer; more particularly, to fuel cell assemblies and systems including a plurality of individual fuel cells in a stack wherein oxygen and reformed fuel are supplied to the stack; and most particularly, to an apparatus for shutdown of a solid-oxide fuel cell system and a method for anode oxidation prevention within the stack during an emergency system shutdown.

BACKGROUND OF THE INVENTION

Fuel cells, which generate electric current by the electrochemical combination of hydrogen and oxygen, are well known. In one form of such a fuel cell, an anodic layer and a cathodic layer are separated by an electrolyte formed of a ceramic solid oxide. Such a fuel cell is known in the art as a Solid-Oxide Fuel Cell (SOFC). SOFC systems derive electrical power through a high-efficiency conversion process from a variety of fuels including natural gas, liquefied petroleum gas, ethanol, and other hydrocarbon and non-hydrocarbon fuels. Hydrogen, either pure or reformed from hydrocarbons, is flowed along the outer surface of the anode and diffuses into the anode. Oxygen, typically from air, is flowed along the outer surface of the cathode and diffuses into the cathode.

Each $O_2$ molecule is split and reduced to two $O^{-2}$ anions catalytically by the cathode. The oxygen anions transport through the electrolyte and combine at the anode/electrolyte interface with four hydrogen ions to form two molecules of water. The anode and cathode are connected externally through a load to complete the circuit whereby four electrons are transferred from the anode to the cathode.

When hydrogen as a feed stock for the fuel cell is derived by "reforming" hydrocarbons such as gasoline in the presence of limited oxygen, the reformate gas includes CO which is converted to $CO_2$ at the anode via an oxidation process similar to that performed on the hydrogen. A single fuel cell is capable of generating a relatively small amount of voltage and wattage and, therefore, in practice it is known to stack a plurality of fuel cells together in electrical series.

Reformed gasoline is a commonly used feed stock in automotive fuel cell applications. Reformate gas is typically the effluent from a catalytic liquid or gaseous hydrogen oxidizing reformer and is often referred to as "fuel gas" or "reformate". Reformate typically includes amounts of carbon monoxide (CO) as fuel in addition to molecular hydrogen. The reforming operation and the fuel cell operation may be considered as first and second oxidative steps of the hydrocarbon fuel, resulting ultimately in water and carbon dioxide. Both reactions are preferably carried out at relatively high temperatures, for example, in the range of about 700° C. to about 900° C.

Since optimum fuel consumption and electrical generation, and therefore optimum efficiency of a SOFC stack, are reached at relatively high operating temperatures, a cooling process needs to be performed during normal system shutdowns. The normal system shutdown is a period that occurs, for example, prior to an extended duration of nonuse. Typically, the SOFC stack is cooled with air utilizing the cathode airflow. Due to the relative high operating temperature of the SOFC stack, typically about 750° C. and higher, and the chemical composition of the anodes, purging the entire SOFC stack with cathode air for cooling prior to extended periods of nonuse results in a degrading and fatiguing oxidation of the anodes since oxygen is allowed in the cavities adjacent to the anodes. The anode side of the fuel cell is, in part, nickel. At temperatures above about 400° C., and in the presence of free oxygen, nickel oxide is formed, which may lead to deterioration of the SOFC stack and which over time may cause failure of the SOFC stack. Therefore, it is harmful to the SOFC stack when oxygen is allowed in the cavities adjacent to the plurality of anodes.

The currently accepted method for preventing the oxidation of the anodes in a laboratory environment is a process in which the cavities in the anode side of the SOFC stack are continuously purged with a fluid containing no free oxygen during a normal cooling process. For example, a blend of bottled reducing gas may be flowed through the anode side of the SOFC stack while the system cools from its operating temperature to a temperature below about 400° C. where harmful oxidation of the anodes ceases. Though a purge is required, such continuous purging process requires more pressurized reducing gas than can be stored on an onboard system, such as what might be needed in a non-stationary motor vehicle.

A typical SOFC system requires usually between four to eight hours to cool from its operating temperature to a temperature that will not harm the anode side of the stack. During this time, a continuous purging process will exhaust more reducing gas than a volume of storage bottles, equal to the size of the entire system, can hold. While purging the anode side of the stack during a normal cooling process with a reducing fluid produced by the SOFC system itself, such as utilization of exhaust gas where oxygen has been reduced below ignition concentration, has been proposed, this is not a solution for emergency system shutdowns when an unexpected event requires an immediate shutdown of the entire SOFC system including the use of external power. In such emergency situation, the SOFC system does not have time to execute its normal shutdown process and the anode components of the stack cannot be protected from detrimental oxidation. No protecting mechanisms for the anode side of the stack are currently known for such emergency situation.

What is needed in the art is a cooling apparatus and strategy that prevents detrimental oxidation of the anode side of the stack from occurring in the event that a sudden and complete emergency shutdown of the SOFC system is necessary.

It is a principal object of the present invention to provide an apparatus that enables a SOFC system to safely cool down during an emergency system shutdown, while the anodes of the stack are protected from oxidation by a reducing environment.

It is a further object of the invention to provide an apparatus that requires only a fraction of space required by prior art gas bottles to provide the desired oxygen-free environment.

SUMMARY OF THE INVENTION

Briefly described, an apparatus and method for an emergency shutdown of a SOFC system enables prevention of the degrading and fatiguing oxidation of the anodes of the stack in the event that a sudden and complete system shutdown is necessary.

The unique and novel apparatus utilizes a battery, a timing circuit, a temperature sensor, a reservoir containing a reducing fluid, and a valve. In order to control the flow of reducing fluid to the stack of the SOFC system, the valve is controlled by the timing circuit. Upon a system emergency shutdown, the timing circuit will be enabled and will pulse the valve, allowing an intermittent flow of the reducing fluid. For a prescribed period of time the valve is opened allowing the flow of reducing fluid, and then the valve is closed, blocking the flow of reducing fluid for a prescribed period of time. This flow pulsation may continue until the temperature sensor, located within the system, reaches a prescribed set point that preferably lies below the critical temperature for anode oxidation, or until the reducing fluid reservoir is empty. It is not necessary for the reducing fluid flow to be cut off once the desired temperature of the system is reached. However, a reservoir of reducing fluid may be used multiple times on a single filling if it can be shut off once a safe temperature is achieved. By intermittently providing a reducing fluid to the anode side of the fuel cell stack, the volume of the reducing fluid required per shutdown can be reduced compared to prior art continuously flowing systems, while an oxygen free environment surrounding the anodes of the stack can be maintained.

Another advantage of the apparatus for an emergency system shutdown in accordance with the invention is the ability to operate independently of the main power plant. The apparatus does not require any active control from the SOFC system, and therefore can be used in an immediate emergency shutdown situation. The disclosed apparatus is entirely a stand-alone component that may be added to any conventional SOFC system. The apparatus in accordance with the invention can be recharged, allowing the same hardware to be used over and over, however, a disposable unit could be used if found to be desirable.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
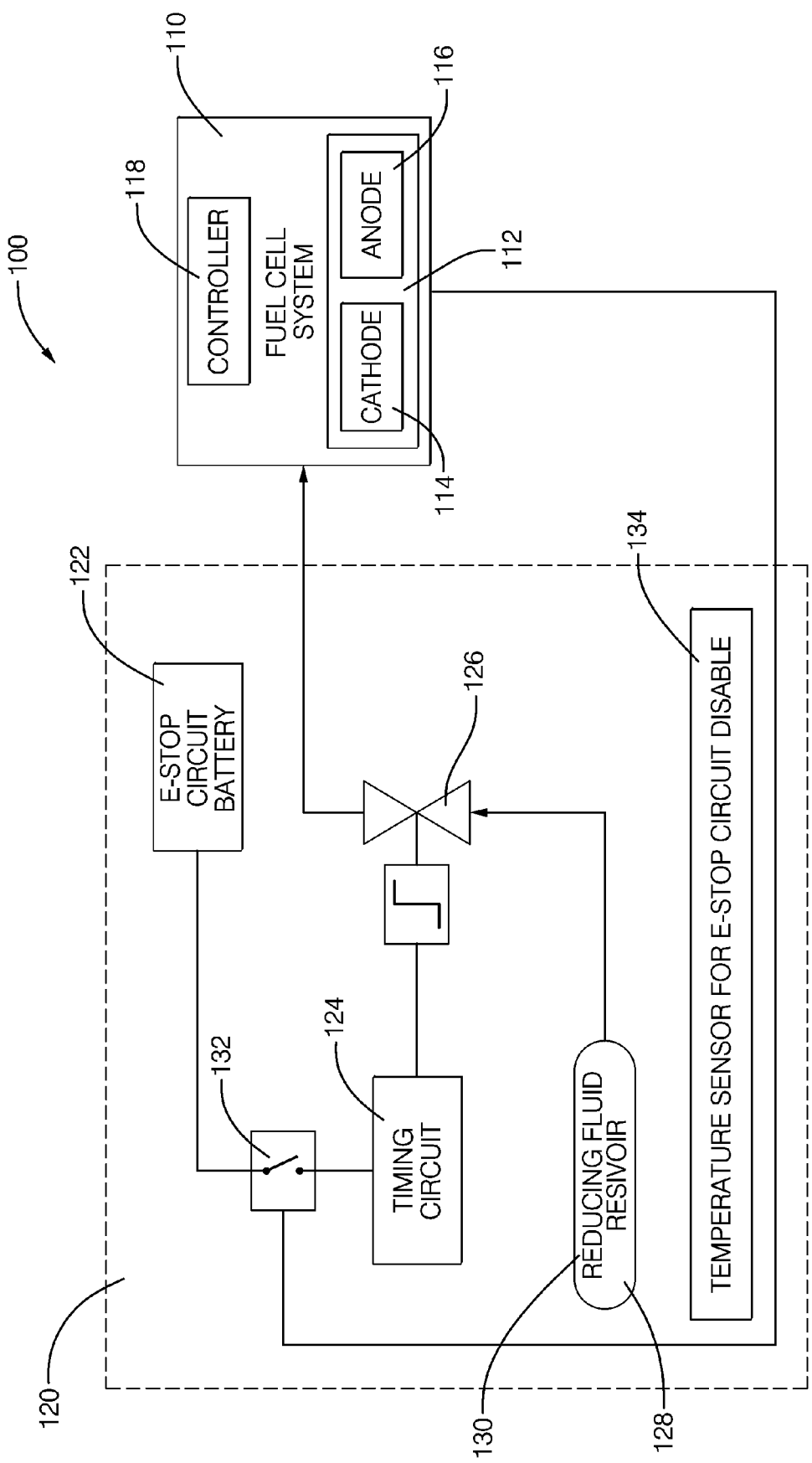
FIG. 1 is a schematic mechanization diagram of an SOFC power plant in accordance with the invention.

Referring to FIG. 1, a schematic mechanization diagram of a Solid-Oxide Fuel Cell (SOFC) power plant 100 in accordance with the invention shows a SOFC system 110 and an emergency shutdown apparatus 120.

The SOFC system 110 includes at least one SOFC stack 112 as well as auxiliary equipment and controls. SOFC stack 112 includes a plurality of solid-oxide fuel cells stacked together in electrical series. Each of the fuel cells includes a cathode 114 and an anode 116, the plurality of cathodes 114 forming the cathode side of stack 112 and the plurality of anodes 116 forming the anode side of stack 112. Because each anode 116 and cathode 114 must have a free space for fluid passage over its surface, the cathode side and the anode side of stack 112 are typically separated by perimeter spacers which are selectively vented to permit fluid flow to the anodes 116 and cathodes 114 as desired but which also form seals on the axial surfaces to prevent fluid leakage from the cathode side of stack 112 to the anode side of stack 112 and vise versa. Thus, all of the cathodes 114 are in parallel pneumatic flow and all of the anodes 116 are in parallel pneumatic flow.

Emergency shutdown apparatus 120 includes a battery 122, a timing circuit 124, a valve 126, and a reservoir 128 holding a reducing fluid 130. Battery 122 may be any battery suitable as an emergency-stop circuit battery and is used only to power timing circuit 124. Battery 122 may be a rechargeable battery. Timing circuit 124 operates and controls valve 126. Valve 126 may be a solenoid actuated valve or any other valve operable by a timing device, such as timing circuit 124. Valve 126 is connected with reservoir 128 and enables or prevents the flow of reducing fluid 130 from reservoir 128 to SOFC stack 112.

Reducing fluid 130 may be a reducing gas, for example a gas mixture containing 95% nitrogen and 5% hydrogen, or a reducing liquid. In any case, reducing fluid 130 may not contain free oxygen. Reducing fluid 130 may be pressurized within reservoir 128, thereby eliminating a need for a pump to flow the reducing fluid toward stack 112. The size of reservoir 128 is adapted to hold enough reducing fluid 130 to provide an oxygen-free environment around the anodes 116 of SOFC stack 112 during at least one emergency shutdown of fuel cell system 110. Reservoir 128 may be refillable after an emergency use and may also be replaceable as a reservoir cartridge. It may further be possible to use reformate as reducing fluid 130 and to fill and refill reservoir 128 with reformate produced during normal operation of SOFC system 110. In this case a pump or compressor that pumps reformate produced by system 110 into reservoir 128 during normal system operation could be integrated between fuel cell system 110 and emergency shutdown apparatus 120.

Emergency shutdown apparatus 120 further includes a relay 132 positioned between battery 122 and timing circuit 124. Relay 132 is used to activate timing circuit 124 and, therefore, to enable operation of emergency shutdown apparatus 120. Relay 132 may be a relay that is normally closed but is opened by a signal from a controller 118 of SOFC system 110 when system 110 is in a normal operating state at elevated temperatures. In case of an emergency shutdown of system 110, this signal is lost and relay 132 closes allowing battery 122 to power timing circuit 124.

Emergency shutdown apparatus 120 may further include a temperature sensor 134 that may be used to disable operation of timing circuit 124 and, therefore, of emergency shutdown apparatus 120. Temperature sensor 134 may be positioned downstream of or within SOFC stack 112. When temperature sensor 134 reaches a prescribed set point or calibrated threshold, such as a temperature below the oxidation temperature of the anodes 116, which is typically around about 400° C., relay 132 or a second relay or other type of temperature switch (not shown) may be activated to disable operation of timing circuit 124 and, therefore, to stop flow of reducing fluid 130 to stack 112. By integrating temperature sensor 134 and by enabling shut off of the flow of reducing fluid 130, reservoir 128 may be used multiple times on a single filling. Still, it is not necessary or may not be desirable to include temperature sensor 134 to cut off the flow of reducing fluid 130 once a safe temperature of stack 112 is reached, since it is also possible to flow reducing fluid 130 to stack 112 until reservoir 128 is empty. In this case, reservoir 128 will simply empty and battery 122 will drain, neither occurrence being problematic, since the fluid reservoir and battery charge can be replenished after the emergency shutdown procedure is completed. It may further be possible to use a signal from temperature sensor 134 instead of the above described signal from controller 118 to activate operation of apparatus 120.

When SOFC system 110 is operated in a mode at elevated temperatures, such as during warm-up, in a power producing mode, or at a hot idle mode, an emergency shutdown of system 110 may be initiated at any time by either controller 118 of system 110 (automatically) or by an operator (manually). Once the emergency shutdown of SOFC system 110 has been initiated, emergency shutdown apparatus 120 is activated. Relay 132 closes thereby enabling battery 122 to power timing circuit 124. Timing circuit 124 pulses valve 126, thereby opening valve 126 for a first prescribed period of time and closing valve 126 for a second prescribed period of time in an alternating fashion. As a result, flow of reducing fluid 130 to the anodes 116 of stack 112 is allowed for the first prescribed period of time and flow of reducing fluid 130 to the anodes 116 of stack 112 is blocked for the second prescribed period of time generating a flow pulsation. This flow pulsation of reducing fluid 130 continues until temperature sensor 134 reaches a prescribed set point and disables operation of timing circuit 124 or until reservoir 128 is empty. While it is possible to provide a continuous flow of reducing fluid 130 to stack 112, a pulsed, intermittent flow is preferred in order to keep the size of reservoir 128 as small as possible. A continuous flow of reducing fluid 130 to stack 112 is not needed to achieve an oxygen-free environment around the anodes 116 of stack 112. Upon opening of valve 126, reducing fluid 130 may be provided directly to stack 112 or may be provided to existing conduits of SOFC system 110 upstream of stack 112.

Figure 2:
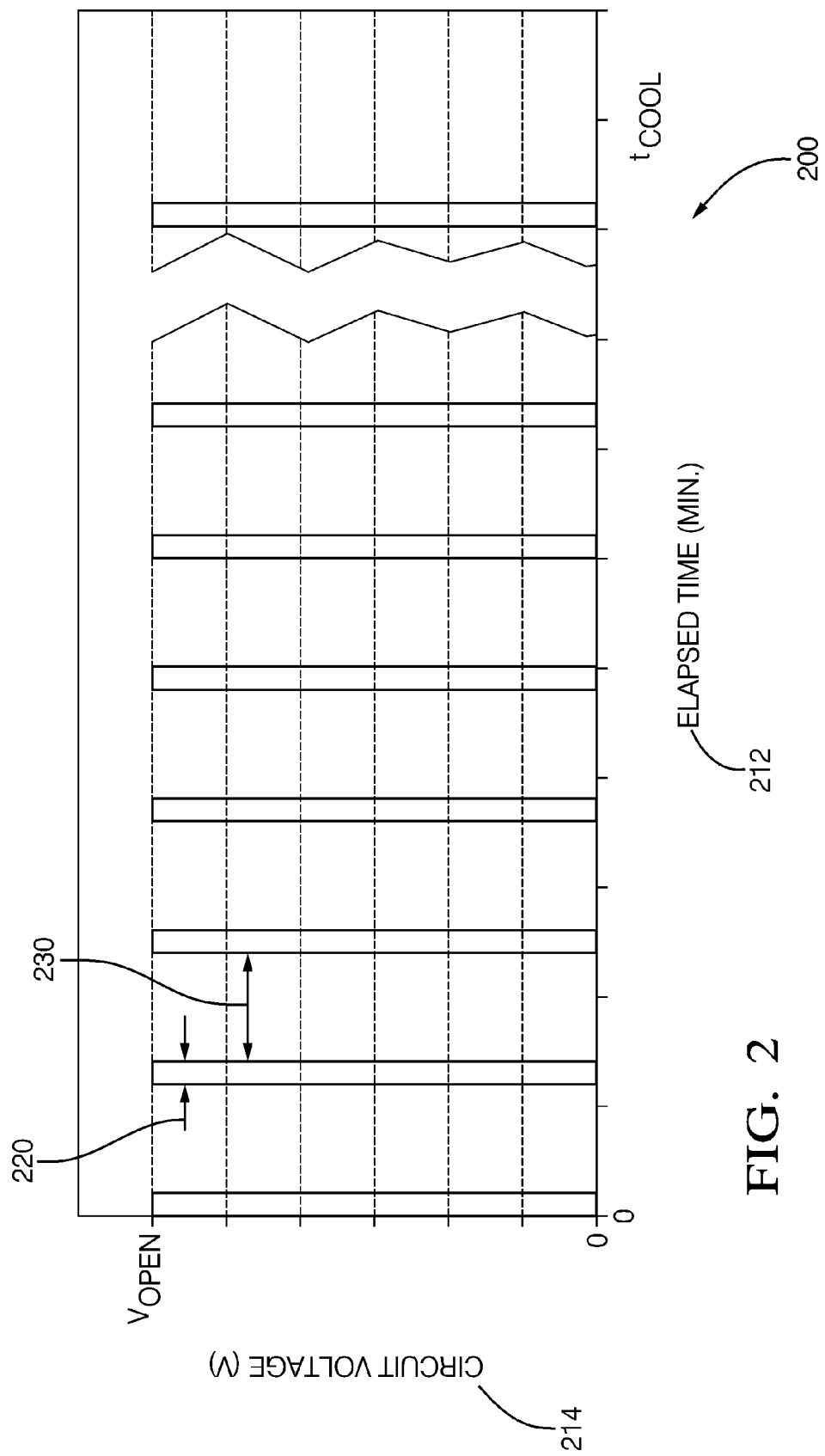
FIG. 2 is a schematic chart of an example pulsing strategy in accordance with the invention.

Referring to FIG. 2, an example of a pulsing strategy 200 is illustrated. As can be seen, valve 126 is operated at a fixed rate. Upon activation of timing circuit 124 at elapsed time 212 of zero minutes, timing circuit 124 provides a voltage 214 of a certain preset value $V_{open}$ to open valve 124 for a first period of time 220. Then, voltage 214 drops down to zero volts to close valve 124 for a second period of time 230 creating a flow pulsation. Voltage 214 is shown to alternate between $V_{open}$ and zero volts at a constant rate until a temperature below the oxidation risk of anodes 116 is reached at an elapsed time $t_{cool}$. At $t_{cool}$, temperature sensor 134 sends a signal to deactivate timing circuit 124. When temperature sensor 134 is not used to deactivate timing circuit 124, the flow pulsation may continue beyond $t_{cool}$ until reservoir 128 is empty.

The first period of time 220 and the second period of time 230 are infinitely variable and may be calibrated as desired for a specific application. The first period of time 220 may be shortened or prolonged to keep valve 124 open for a shorter or longer time, respectively. The second period of time 230 may be shortened or prolonged to keep valve 124 closed for a shorter or longer time, respectively.

While first period of time 220 and second period of time 230 are shown in FIG. 2 to be constant over the entire elapsed time 212, they may be varied over elapsed time 212. For example, the occurrences of valve 126 openings may be reduced by extending the second periods of time 230 with increasing elapsed time 212. It may further be possible, to sense the state of reservoir 128 and to adjust the timing of valve 126 accordingly.

By purging the anode side of stack 112 intermittently with reducing fluid 130 after an emergency shutdown of SOFC system 110, air and therefore oxygen is prevented from entering the anode side of stack 112 and stack 112 can safely cool down to a temperature where detrimental oxidation of the anodes 116 will not occur anymore, typically below 400° C. By pulsing the flow of reducing fluid 130, the size of reservoir 128 may be minimized.

By providing emergency shutdown apparatus 120 as a stand-alone unit that operates independently from the SOFC system 110 and that does not require any active control from SOFC system 110, an oxygen-free environment needed to prevent damage to stack 112 at oxidation enabling temperatures can be provided in the event that a sudden and complete shutdown of the SOFC system 110 is necessary.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An emergency shutdown apparatus for a solid-oxide fuel cell system including a fuel cell stack, the apparatus comprising:
 a reservoir containing a reducing fluid;
 a valve enabling or preventing flow of said reducing fluid from said reservoir to said fuel cell stack;
 a timing circuit operating and controlling said valve; and
 a power source powering said timing circuit.

2. The apparatus of claim 1, wherein the power source is a battery.

3. The apparatus of claim 1, wherein the power source is a rechargeable battery.

4. The apparatus of claim 1, further including a relay positioned between said power source and said timing circuit, wherein said relay enables activation of said timing circuit.

5. The apparatus of claim 4, wherein said relay is a normally closed relay, wherein said relay is opened by a signal from said fuel cell system, and wherein said relay closes when said signal is lost.

6. The apparatus of claim 1, further including a temperature sensor that detects a temperature of said fuel cell stack, wherein said temperature sensor disables operation of said timing circuit when said temperature of said fuel cell stack reaches a prescribed set point.

7. The apparatus of claim 6, wherein said prescribed set point is a temperature below an oxidation temperature of said fuel cell stack.

8. The apparatus of claim 1, further including a second relay activated by a temperature sensor at a calibrated threshold, wherein said second relay disables operation of said timing circuit.

9. The apparatus of claim 1, wherein said flow of said reducing fluid is intermittent.

10. The apparatus of claim 1, wherein said timing circuit pulses said valve, and wherein said timing circuit opens said valve for a first prescribed period of time and closes said valve for a second prescribed period of time in an alternating fashion.

11. The apparatus of claim 1, wherein said timing circuit pulses said valve at a fixed rate.

12. The apparatus of claim 1, wherein said valve is a solenoid actuated valve, and wherein said solenoid is activated by a voltage provided by said timing circuit.

13. A solid-oxide fuel cell power plant, comprising:
 a solid-oxide fuel cell system including at least one solid-oxide fuel cell stack having a plurality of anodes; and an emergency shutdown apparatus providing a flow of a reducing fluid to said anodes when activated;

wherein said emergency shutdown apparatus is activated concurrently with an emergency shutdown of said fuel cell system.

14. The solid-oxide fuel cell power plant of claim 13, wherein said flow of reducing fluid is intermittent.

15. The solid-oxide fuel cell power plant of claim 13, wherein said emergency shutdown apparatus includes a timing circuit that is powered by a battery, wherein said timing circuit pulses a valve, and wherein said valve enables and prevents said flow of said reducing fluid for prescribed periods of time in an alternating fashion.

16. The solid-oxide fuel cell power plant of claim 13, wherein said reducing fluid is stored in a reservoir, wherein said reservoir is refillable.

17. The solid-oxide fuel cell power plant of claim 13, wherein said reducing fluid is stored in a reservoir, wherein said reservoir is exchangeable.

18. The solid-oxide fuel cell power plant of claim 13, wherein said reducing fluid is a reducing gas mixture.

19. The solid-oxide fuel cell power plant of claim 13, wherein said reducing fluid is reformate produced during normal operation of said solid-oxide fuel cell system, and wherein said reformate is pumped by said solid-oxide fuel cell system into a reservoir of said emergency shutdown apparatus to fill and refill said reservoir.

20. The solid-oxide fuel cell power plant of claim 13, wherein a relay positioned between a battery and a timing circuit activates said emergency shutdown apparatus, wherein said relay closes when a signal from said solid-oxide fuel cell system is lost upon emergency shutdown.

21. The solid-oxide fuel cell power plant of claim 13, wherein a temperature sensor that detects the temperature of said solid-oxide fuel cell stack deactivates said emergency shutdown apparatus when a calibrated threshold is reached.

22. The solid-oxide fuel cell power plant of claim 13, wherein a state of a reservoir containing said reducing fluid is sensed, and wherein timing of said flow of said reducing fluid is adjusted accordingly.

23. A method for preventing oxidation of anodes contained in a fuel cell stack during an emergency shutdown of a solid-oxide fuel cell system, comprising the steps of:

activating a timing circuit that controls a valve concurrently to said emergency shutdown; and pulsing said valve with said timing circuit to enable and disable flow of a reducing fluid from a reservoir to said anodes for prescribed periods of time in an alternating fashion.

24. The method of claim 23, further comprising the steps of:

providing a signal from said fuel cell system to open a normally closed relay during normal operation of said fuel cell system at elevated temperatures;

closing said relay when said signal is lost upon an emergency shutdown of said fuel cell system; and powering said timing circuit with a battery.

25. The method of claim 23, further comprising the steps of:

using reformate produced during normal operation of said fuel cell system as said reducing fluid; and filling and refilling said reservoir with said reformate during normal operation of said fuel cell system.

26. The method of claim 23, further comprising the steps of:

sensing a state of said reservoir; and adjusting timing of said valve accordingly.

* * * * *